(12) United States Patent
Wagoner

(10) Patent No.: US 9,118,184 B2
(45) Date of Patent: Aug. 25, 2015

(54) ALTERNATIVE POWER CONVERTER SYSTEM

(75) Inventor: Robert Gregory Wagoner, Salem, VA (US)

(73) Assignee: General Electric Company, Schenectady, NY (US)

( * ) Notice: Subject to any disclaimer, the term of this patent is extended or adjusted under 35 U.S.C. 154(b) by 253 days.

(21) Appl. No.: 13/586,402

(22) Filed: Aug. 15, 2012

(65) Prior Publication Data

US 2014/0049859 A1  Feb. 20, 2014

(51) Int. Cl.
*H02H 7/00* (2006.01)
*H02H 9/00* (2006.01)
*H02J 3/00* (2006.01)

(52) U.S. Cl.
CPC . *H02J 3/00* (2013.01); *Y02E 10/725* (2013.01)

(58) Field of Classification Search
CPC ......... H02M 7/00; H02M 5/45; H02M 5/458; H02P 9/00; H02P 27/00
USPC ........................................................... 363/35
See application file for complete search history.

(56) References Cited

U.S. PATENT DOCUMENTS

| | | | |
|---|---|---|---|
| 7,944,068 B2 * | 5/2011 | Wagoner et al. | 290/44 |
| 8,097,970 B2 * | 1/2012 | Hyvarinen | 290/44 |
| 8,228,690 B2 * | 7/2012 | Watanabe et al. | 363/16 |

* cited by examiner

*Primary Examiner* — Dharti Patel
(74) *Attorney, Agent, or Firm* — Sutherland Asbill & Brennan LLP

(57) ABSTRACT

An energy power converter system is provided. According to one embodiment, the system includes a plurality of parallel converters; a main transformer with a separate magnetic path for magnetic fields are generated in the transformer by a summation of currents coming from the plurality of parallel converters electrically coupled to the main transformer; and a converter control device electrically coupled to the plurality of parallel converters and the main transformer. The converter control device may be configured to discontinue electrical flow in the system based at least in part on detection of an electrical fault condition.

18 Claims, 9 Drawing Sheets

ALTERNATIVE POWER CONVERTER SYSTEM

TECHNICAL FIELD

This disclosure relates generally to converter systems, and more particularly, to alternative energy power converter systems including transformers with a separate path for a magnetic flux generated by common mode currents.

BACKGROUND

Due to the world-wide concerns about undesired consequences of using fossil fuels to produce energy, alternative or renewable energy technologies have been on the rise. Wind power is one popular renewable energy source. Using wind power involves conversion of wind energy into a more useful form of energy, such as electricity.

In a wind turbine, electricity is produced by the wind turning multiple blades connected to a rotor. The spin of the blades caused by the wind rotates a shaft of the rotor, which connects to a generator that generates electricity. The rotor may be mounted within a housing or nacelle, which is positioned on top of a truss or tubular tower (sometimes as high as 300 feet). Utility grade wind turbines (e.g., wind turbines designed to provide electrical power to a utility grid) may include large rotors (e.g., 100 or more feet in diameter). The blades of these rotors may transform the wind energy into a rotational torque or force that drives one or more generators, which are rotationally coupled to the rotor through a gearbox. The gearbox may be used to step up the inherently low rotational speed of the turbine rotor for the generator to efficiently convert mechanical energy to electrical energy, which is then provided to a utility grid. Some turbines utilize generators that are directly coupled to the rotor without using a gearbox. Various types of generators may be used in wind turbines.

Wind turbines may include power converter systems. A power converter system is typically used to convert input electrical current, which may be fixed frequency alternating current, variable frequency alternating current, or direct current, to a desired output frequency and voltage level. A converter system usually includes several power semiconductor switches such as insulated gate bipolar transistors (IGBTs), integrated gate commutated thyristors (IGCTs or GCTs), or metal oxide semiconductor field effect transistors (MOSFETs) that are switched on at certain frequencies to generate the desired converter output voltage and frequency. The converter output voltage is then provided to various loads. "Loads", as the term is used herein, is intended to broadly include motors, power grids, and resistive loads, for example.

As the desired power level of a wind turbine increases, some wind turbine systems may require multiple power converters operating together in parallel to achieve the desired power rating.

FIG. 1 is a schematic representation of a conventional power system including multiple parallel converters. A power system 100 may be configured to supply power to a load 120. The power supplied may be generated by a generator 105 and subsequently provided to a power converter system 110. The power converter system 110 may comprise converters 110-1 through 110-N. The converters 110-1 through 110-N may be coupled in parallel and configured to receive power from the generator 105. The power converter system 110 may convert the received power and provide it to the load 120. The load 120 may include power grids, motors, resistive loads, and the like.

The power system 100 may also comprise a converter control system 115. The converter control system 115 may be configured to provide control signals for the operation of the power system 100. The converter control system 115 may be coupled to the power converter system 110 and configured to drive the power converter system 110 according to predesignated switching patterns. The predesignated switching patterns provided by the converter control system 115 may provide for synchronous gating of the multiple parallel converters or may provide an interleaved manner of control for each converter thread with phase displaced gating signals to reduce overall switching harmonic components due to cancellation of phase shifted switching waveforms.

Multiple converters operated in parallel within the power converter system 110 may provide high availability and low distortion. However, power systems utilizing multiple parallel converters may create common-mode currents flowing between the parallel converters, and this leads to a need for common-mode chokes, or otherwise isolating the converters at either the generator side or the line side to break the path of common mode currents between the converters.

As shown by FIG. 2, in some conventional power systems 200, common-mode chokes are used to protect the load 120 and the generator 105. In such existing power systems 200, the power converter system 110 includes generator side chokes 205, a Direct Current (DC) link 215, load side chokes 220, and parallel converters 210. The generator side chokes 205 and load side chokes 220 suppress common-mode current that links both converters 210.

However, this conventional solution may be costly and insufficiently reliable. Moreover, the possibility of arc flash events needs to be considered, since they become more prevalent as the power level of the system increases.

Therefore, with the increase of the desired power levels of power systems, it would be useful to provide power systems with multiple power converters operated together and, subsequently, there is a need for suitable means of optimizing and protecting such systems. According to the present disclosure, this may be achieved by combining multiple parallel converters with a multi-leg main transformer.

BRIEF DESCRIPTION OF THE DISCLOSURE

Embodiments of the disclosure may address some or all of the needs described above. According to one example embodiment, an energy power converter system is provided. The energy power converter system may include a plurality of parallel converters; a main transformer with at least one separate magnetic path for magnetic fields generated in the transformer by a summation of currents coming from the plurality of parallel converters, with the main transformer electrically coupled to the plurality of parallel converters; and a converter control device electrically coupled to the plurality of parallel converters. The converter control device may be configured to discontinue electrical flow in the system based at least in part on detection of an electrical fault condition.

According to another example embodiment, a method for optimization of an energy power converter system is provided. The method may include providing at least one separate magnetic path for magnetic fields, generated in the plurality of parallel converters. The at least one separate magnetic path may be represented by at least one leg of a main transformer. The method may further include discontinuing electrical flow in the system based at least in part on detection of an electrical fault condition.

According to yet another example embodiment, a wind turbine power system is provided. The system may include a parallel power converter device comprising a plurality of parallel converters and a wind turbine generator electrically coupled to the parallel power converter device. The wind turbine generator may be configured to generate electrical power for the parallel power converter system. The system may further include a converter control device coupled to the parallel power converter device and configured to reduce effects of electrical faults in the system, and a main transformer having a multi-leg iron core and windings wound around a plurality of legs of the multi-leg iron core. The main transformer may have a separate magnetic path for magnetic fields generated in the transformer by a summation of currents coming from the plurality of parallel converters.

Other embodiments and aspects of the disclosure will become apparent from the following description taken in conjunction with the following drawings.

DETAILED DESCRIPTION

Figure 1:
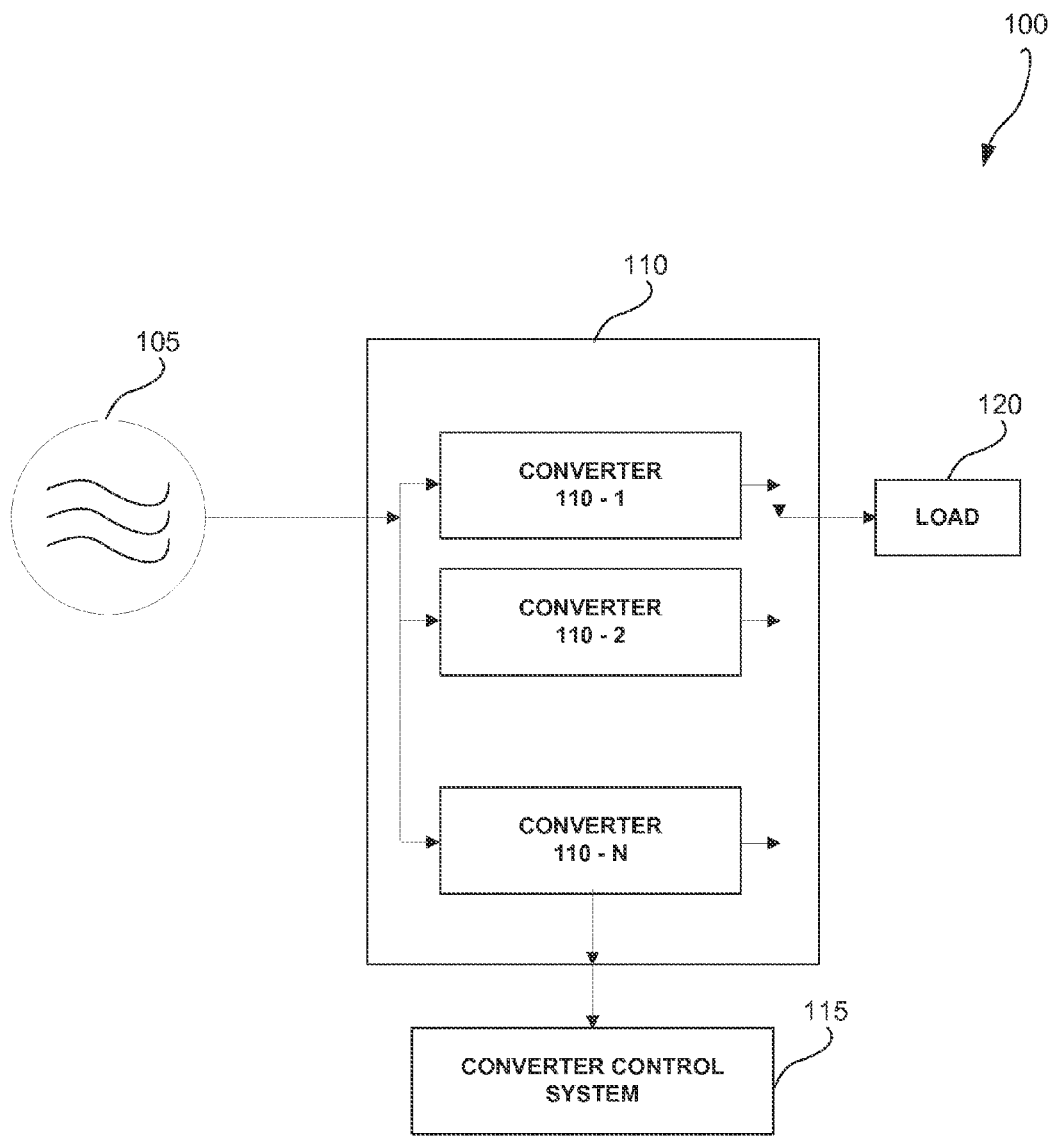
FIG. 1 is a schematic representation of a conventional power system including multiple parallel converters.
Figure 2:
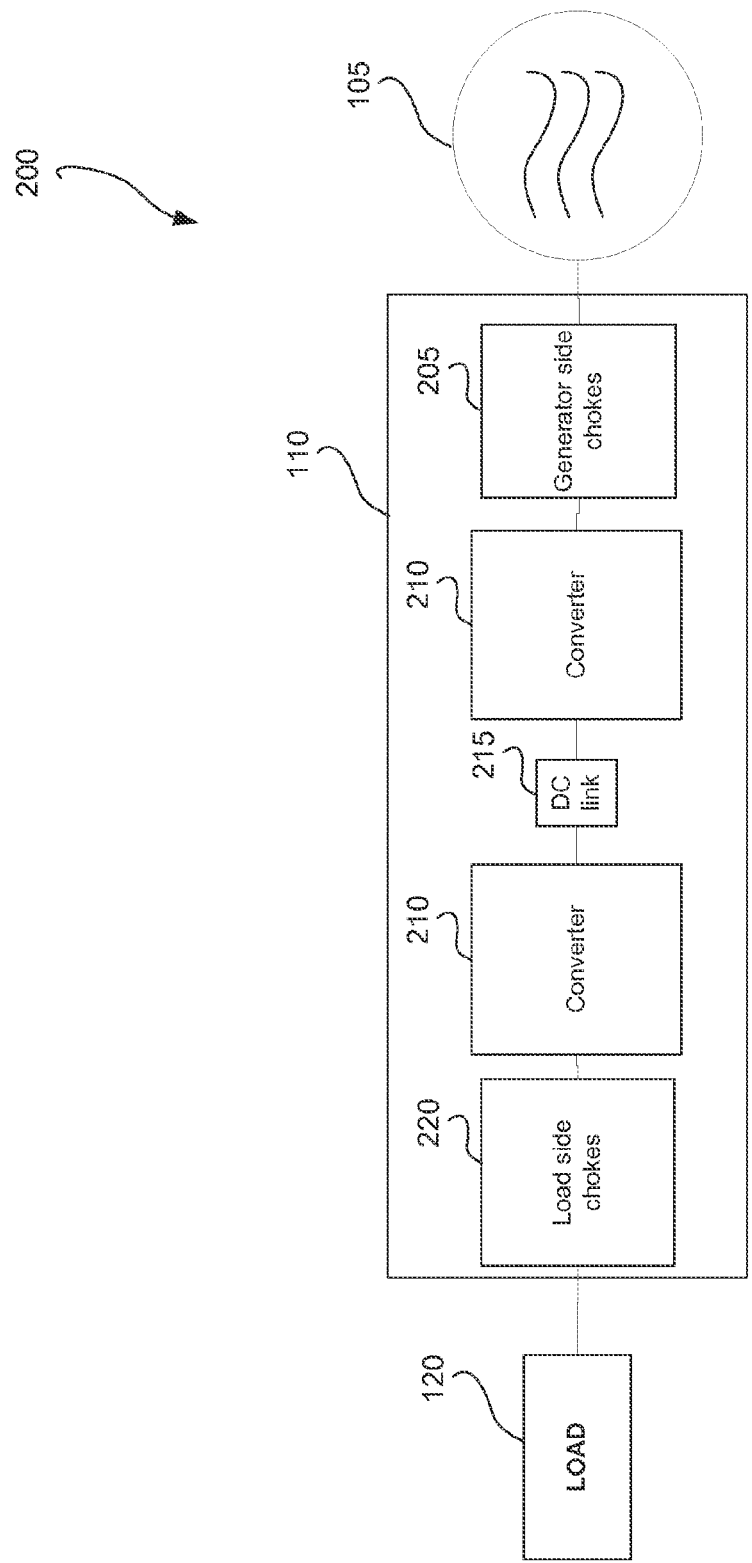
FIG. 2 is a schematic representation of a conventional power converter system including common-mode chokes.

Example embodiments of the disclosure will be described more fully hereinafter with reference to the accompanying drawings, in which some, but not all, embodiments are shown. Indeed, the disclosure may be embodied in many different forms and should not be construed as limited to the embodiments set forth herein; rather, these embodiments are provided so that this disclosure will satisfy applicable legal requirements. Like numbers refer to like, but not necessarily the same or identical, elements throughout.

Certain example embodiments described herein may enable optimizing a power converter system using a transformer (e.g., a multi-leg transformer) having a separate path for magnetic fields to allow a magnetic path for flux generated by common mode currents in a power system. In this document, various embodiments are described with reference to an example wind power system; however, these embodiments may be embodied in various power systems, including, but not limited to, hydro power systems, solar power systems, tidal power systems, wave power systems, geothermal power systems, biomass power systems, and the like.

Existing power systems, such as wind power systems, may require multiple power converters operated together in parallel to achieve a desired power rating. To eliminate the possibility of common mode currents flowing between the parallel converters and to minimize possible arc flash events (which are more prevalent as the power level of the system is increased), a transformer with a separate magnetic path for common mode currents generated in a power system may be used.

The transformer may include a multi-leg transformer such as, for example, a four-leg transformer, five-leg transformer, six-leg transformer, or any transformer with a separate magnetic path for common mode flux. Throughout the remainder of this document, the common term "multi-leg transformer" will be used to describe any transformer with a separate magnetic path for common mode flux.

The use of a multi-leg transformer in the power system with multiple parallel converters may provide a path for common mode flux, thus eliminating the need for common mode chokes that are used in the existing systems to filter out common mode noise in the system. Additionally, the use of a multi-leg transformer eliminates the need for isolation of the converters at either the generator side or the line side to break the path for common mode current between the converters. Accordingly, the configuration of the power system with multiple parallel converters provides for lowering costs and increasing reliability.

Another aspect of this disclosure includes using specific combinations of fault sensing and methods for removing the energy applied to the converter to protect the converter from trip events and minimize the possibility of arc flash events. For example, the locations of sensing and disconnecting elements may be determined to specifically maximize the effect of the sensing and disconnecting elements in the power system.

In certain example embodiments, sensing and disconnecting elements may be specifically located in the power system to maximize overall protection. For example, sensing and disconnecting elements may be located close to the source of the power generation (e.g. generator) to protect a relatively large part of the power system. In other example embodiments, sensing and disconnecting elements may be used to protect each of the parallel converters separately.

Additionally, a converter control system may be used to control parallel converters in the power system. The converter control system may detect, identify, and isolate faults. For example, hardware and software components of the converter control system may be used to perform ground detection functions.

In the disclosed example embodiments, specific safeguards may be provided by carefully considered combinations and/or configurations of disconnects. For each configuration disclosed, a choice between fuses, circuit breakers, and contactors has been selected for protecting and disconnecting various areas of the system. Additionally, for each configuration disclosed, a choice between protection sensing, such as ground fault, fast overcurrent trip, slow overcurrent trip, and reverse power sensing has been made to provide for sensing faults in various areas of the system.

In certain example embodiments, a power system with parallel converters may combine a multi-leg transformer with the various protection schemes. This approach provides for further reduction in the total costs associated with a power system.

The technical effects of certain embodiments of the disclosure may include increasing the reliability and reducing the cost of wind turbine power systems utilizing multiple parallel converters. In particular, the increased reliability and reduced cost may be achieved by eliminating the need for common mode chokes used in some conventional systems to filter out common mode noise. Further technical effects of certain embodiments of the disclosure may include eliminating the need for isolation of converters at either the generator side or the grid side often used to prevent flow of common mode currents between the converters in conventional systems. Yet further technical effects of certain embodiments of the disclosure may include minimizing the possibility of arc flash events, which are prevalent in the conventional systems with increases in the power level.

Example embodiments of the disclosure will now be described with reference to the accompanying figures.

Figure 3:
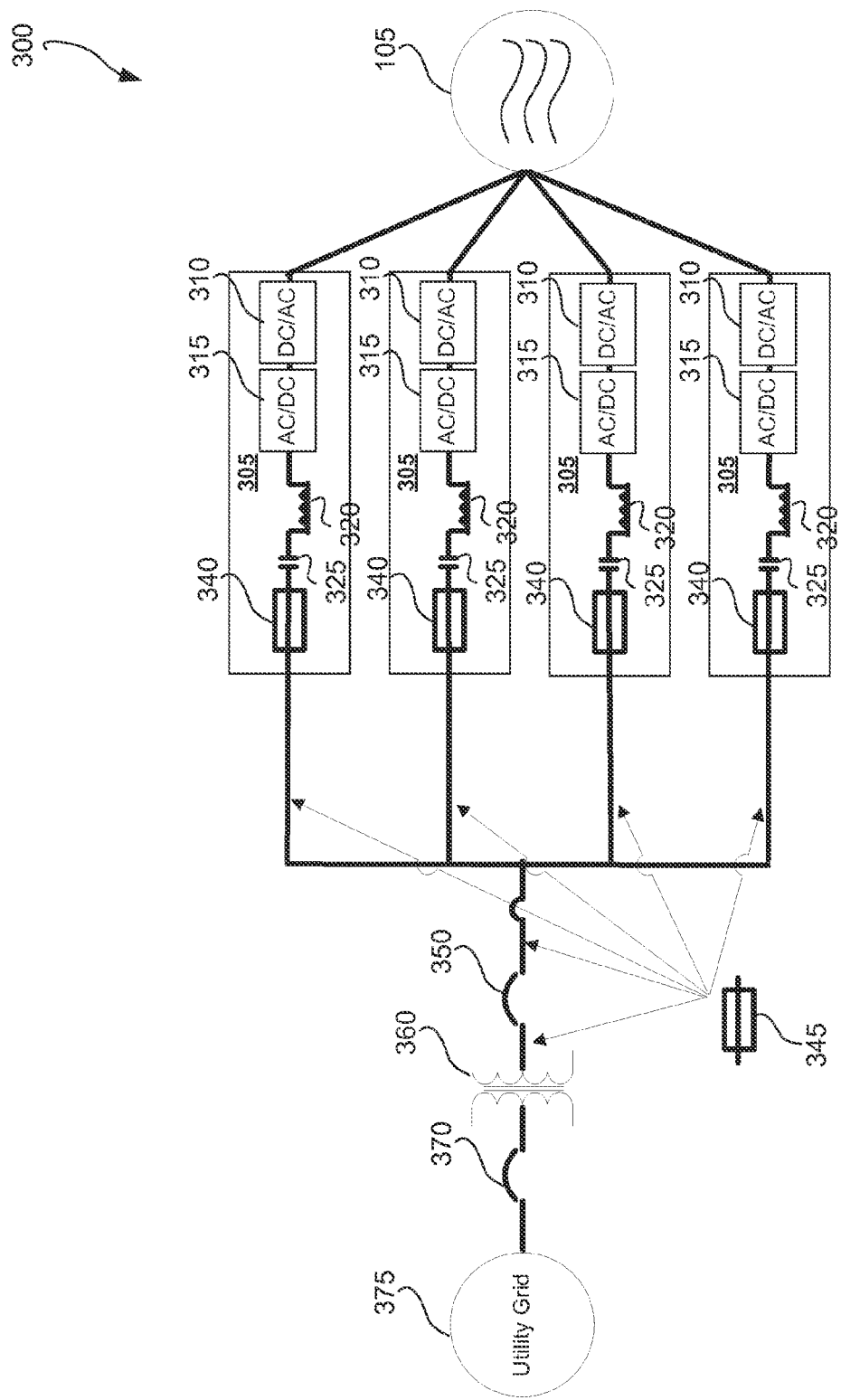
FIG. 3 is a schematic representation of an alternative power converter system with multiple parallel converters and a multi-leg transformer, according to an example embodiment.

FIG. 3 illustrates an embodiment of an alternative power converter system 300 with multiple parallel converters 305 and a main transformer 360. The alternative power converter system 300 may comprise the generator 105, the parallel converters 305, the main transformer 360, a utility grid 375, and so forth. The generator 105 may include a wind turbine generator, solar power generator, tidal power generator, wave power generator, and the like.

In a wind turbine application, the generator 105 may supply input power to the parallel converters 305, and further to the utility grid 375 through the main transformer 360. Though FIG. 3 illustrates four parallel converters 305, the alternative power converter system 300 may include any number of parallel converters 305. The parallel converter 305 may comprise a generator-side converter 310 (DC/AC) and a load side converter 315 (AC/DC) with a DC link 325 for each of them. Additionally, the parallel converter 305 may comprise a fuse protection 340 and a filter 320 to reduce distortion of the voltage waveforms in the parallel converter 305.

The parallel converters 305 may be connected to a circuit breaker 350 for converters, which may provide isolation from grid side power and capability for lockout-tagout during maintenance. The circuit breaker 350 may also provide protection in case of electrical fault conditions, such as overcurrent events, voltage transients, and so forth. The circuit breaker 350 may be connected on the load side to a main transformer 360 for transforming the converter power output to a common bus voltage for the utility grid 375 and may be configured to discontinue electrical flow between the parallel converters 305 and the main transformer 360 to prevent damage to the system.

The main transformer 360 is a multi-leg transformer with at least one separate magnetic path for common mode flux. Combining multiple parallel converters 305 with a multi-leg main transformer 360 eliminates the need for common mode chokes in the system, and also eliminates the need for isolation of the parallel converters 305 at either the generator side or the line side to break the path for common mode current between the parallel converters 305.

These optimizations allow achieving low cost and high reliability of the alternative power converter system 300. Moreover, the usage of the main transformer 360 with a separate magnetic path for common mode flux reduces the possibility of arc flash events, and thereby makes the alternative power converter system 300 more secure.

The main transformer 360 may include, but is not limited to, a five-leg transformer, four-leg transformer, or any transformer with at least one separate magnetic path for common mode flux.

In some example embodiments, the number of magnetic paths of the main transformer 360 may be at least one greater (N+1), than the number on phases in the system (N).

The main transformer 360 may be connected on the load side to a medium voltage (MV) switchgear 370 for generator 105, which may isolate power of the generator 105, including the parallel converters 305, from power of the utility grid 375. The MV switchgear 370 may be used for converter lockout-tagout during generator and converter maintenance.

In some embodiments, the circuit breaker 350 and MV switchgear 370 may be coordinated with a protective relay that senses for ground faults, voltage transients, and other trip indications, and/or uses other arc flash detection methods in the main transformer 360. The protective relay function may be a separate controller or it may be included in the hardware/software of one or more of the converters.

Additionally, in some embodiments, a converter control device (not shown) may be utilized. The converter control device may include software and hardware components and may detect, identify, and isolate faults using instrumentation native to the converter in a novel way, extending the state of the art beyond presently available "ground fault detection." Selecting the best combinations of specific protections used, coupled with careful consideration of separation of components into different cabinets is important. To optimize each solution, locations of certain components are moved into different cabinets to enhance the protection.

Additionally, the alternative power converter system 300 may include current transformers (not shown) used for current sensing and which may or may not be located inside the main transformer 360, inside the parallel converters 305, and/or on the cables between the main transformer 360 and parallel converters 305, as well as on either side of the circuit breaker 350.

In some embodiments, the alternative power converter system 300 may include sensing and breaking elements installed throughout the alternative power converter system 300 to detect faults, trip indication and give commands and/or discontinue electrical flow in the system. For example, such sensing and breaking elements may include additional fuses 345, which may be located inside the main transformer 360, inside the parallel converters 305, and/or on the cables between the transformer 360 and parallel converters 305, as well as on either side of the circuit breaker 350. In any case they are effectively connected on the secondary side of the main transformer 360. The level of arc flash protection in different areas of the system will depend upon the location of the additional fuses 345. According to some example embodiments, the additional fuses 345 may be located close to the main transformer 360. Due to such location, the additional fuses 345 may protect a larger amount of the system beyond the additional fuses 345.

The described embodiment provides a new method of converter protection, which allows for system optimization as well as arc flash protection. Careful coordination of fault sensing and methods of removing the energy applied to the converter 305 may be used to protect the converter 305 from trip events and to minimize the energy of the arc flash event. Another aspect of this embodiment is moving the sensing and disconnecting elements for the protections close to the source of energy to protect a bigger part of the power system.

Figure 4:
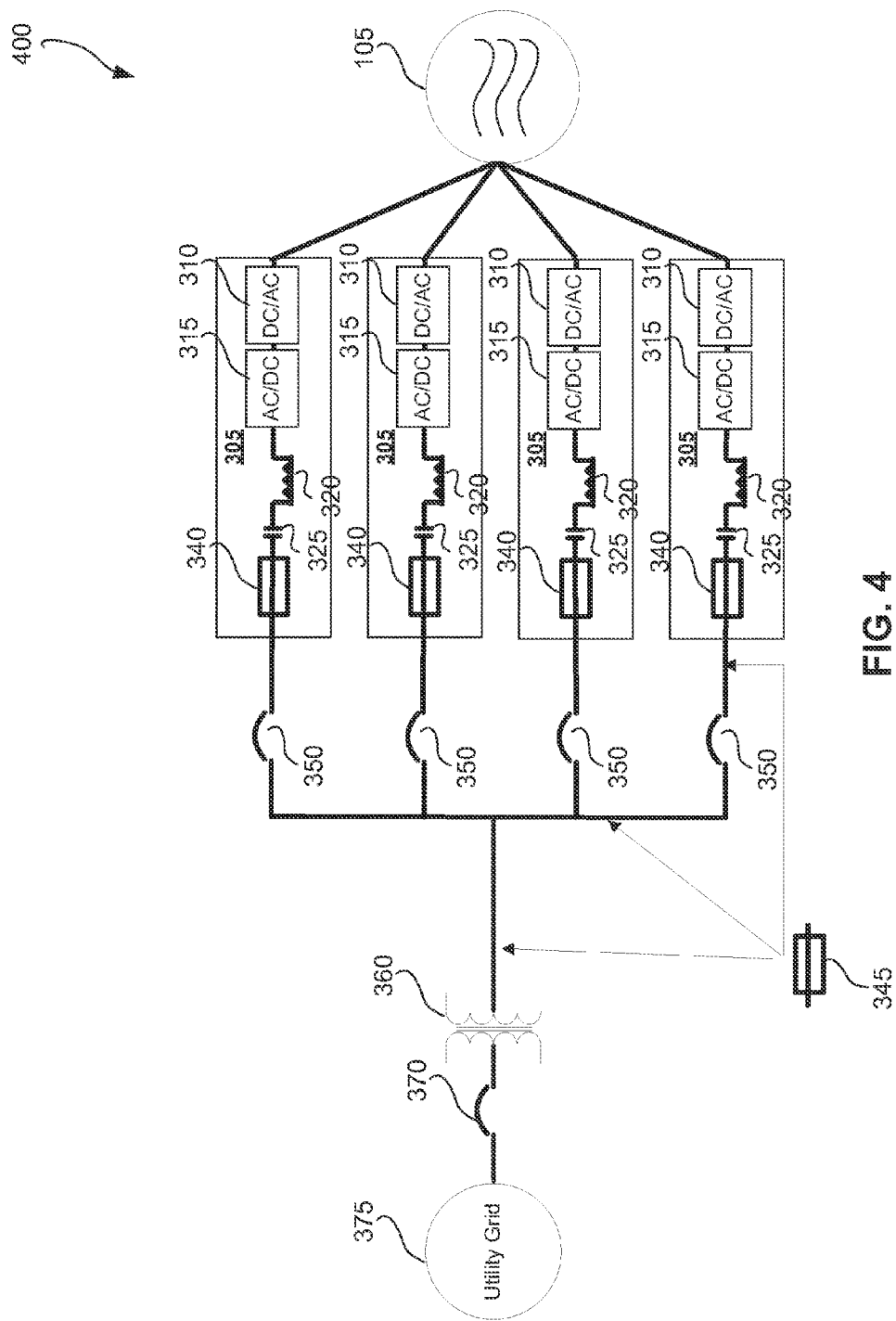
FIG. 4 is another schematic representation of an alternative power converter system with multiple parallel converters and a multi-leg transformer, according to an example embodiment.

An alternative location of sensing and disconnecting elements is illustrated by FIG. 4. An alternative power converter system 400 of FIG. 4 shows a power converter system similar to the alternative power converter system 300 of FIG. 3; however, the alternative power converter system 400 includes a respective circuit breaker 350 for each of the parallel converters 305. As shown on FIG. 4, circuit breakers 350 may be located close to each of the parallel converters 305 to isolate the generator side for each parallel converter 305 separately.

Circuit breakers 350 may be configured to discontinue electrical flow between the corresponding parallel converter 305 and the main transformer 360 to prevent damage to the system.

The embodiments illustrated by FIG. 3 and FIG. 4 disclose configurations representing some example methods of protecting and disconnecting each area of the system. For each embodiment, certain combinations of fuses, circuit breakers, and/or contactors are implemented to provide a specific system and method of power system protection. Moreover, concepts of protection sensing, such as ground fault, fast overcurrent trip, slow overcurrent trip, and reverse power sensing, are also implemented with certain embodiments to provide a specific system and method of sensing faults in each area of the power system. Thus, one technical effect of certain embodiments of the disclosure can result when combining a multi-leg transformer with certain protection schemes in wind turbines with parallel converters can reduce the total power converter system cost, while simultaneously improving reliability, as compared to conventional systems and processes.

The multi-leg transformer used in the embodiments of the alternative energy power converter system may be a six-leg transformer, five-leg transformer, four-leg transformer, or any transformer with a separate magnetic path for common mode flux.

Figure 5:
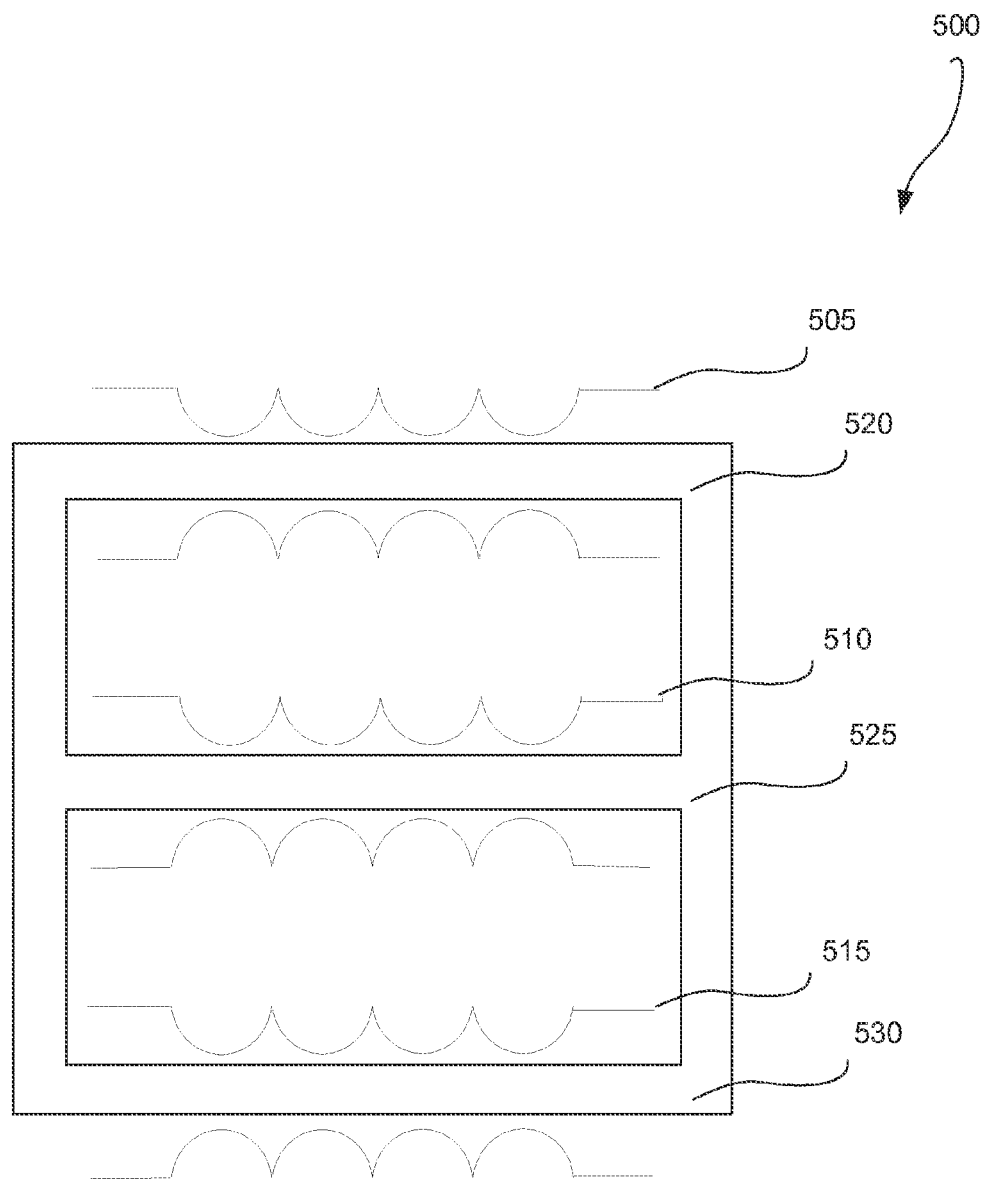
FIG. 5 is a schematic representation of a three-leg transformer with no path for common mode flux.

FIG. 5 is a schematic representation of a three-leg transformer 500 with no path for common mode flux. The three-leg transformer 500 comprises an iron core with legs 520, 525, and 530, each of which has windings 505, 510, and 515 respectively. Therefore, all three legs 520-530 of the three-leg transformer 500 have a winding 505-515, respectively, so the three-leg transformer 500 does not provide a separate magnetic path for common mode flux.

Figure 6:
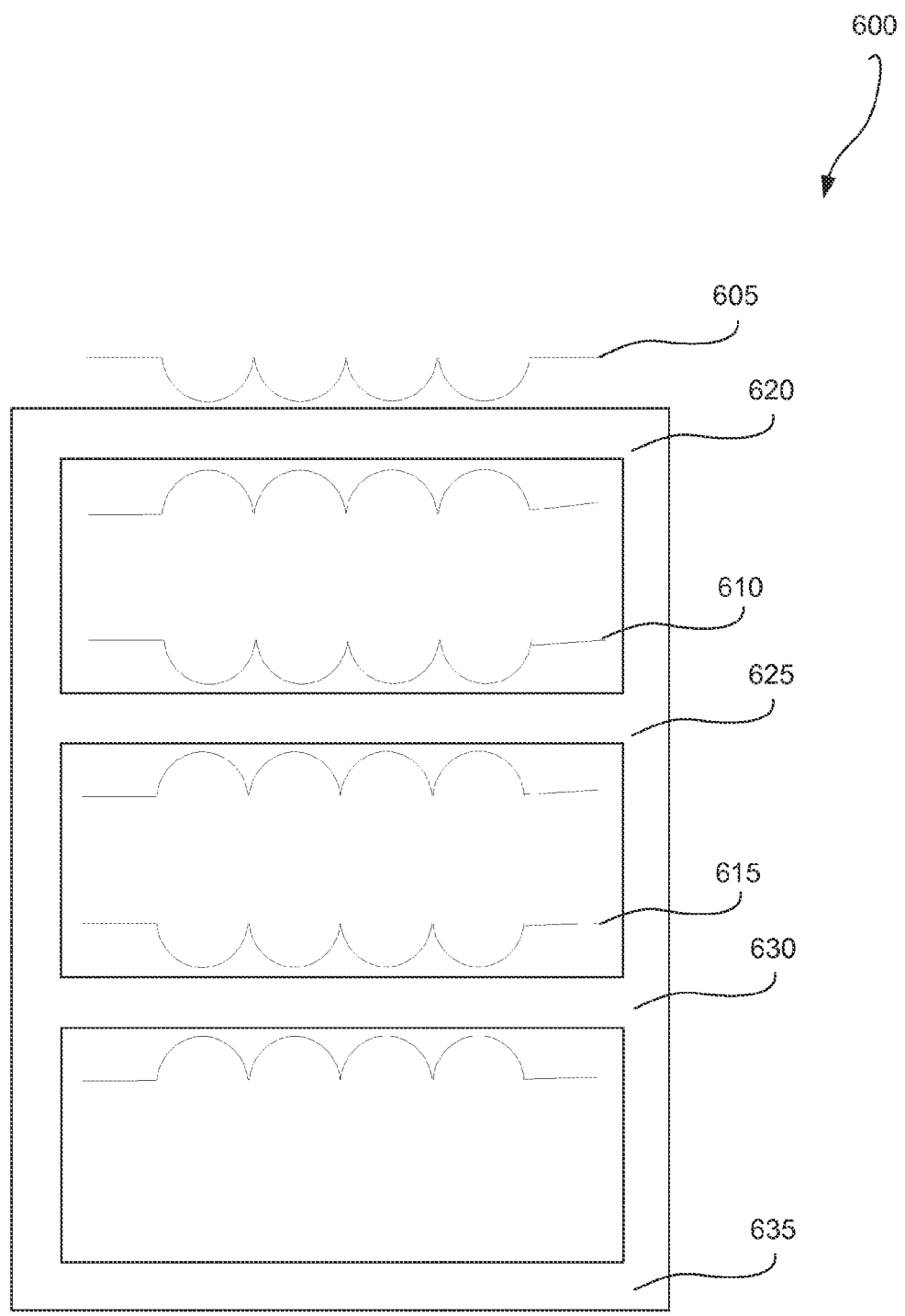
FIG. 6 is a schematic representation of a four-leg transformer with a path for common mode flux, according to an example embodiment.

FIG. 6 is a schematic representation of a four-leg transformer 600 with a path for common mode flux. The four-leg transformer comprises an iron core with legs 620, 625, 630, and 635. Legs 620, 625, and 630 have windings 605, 610, and 615 respectively, while the leg 635 has no winding. Therefore, leg 635 provides a separate magnetic path for common mode flux. When used in the alternative power converter system 300 or alternative power converter system 400, four-leg transformer 600 may provide a separate magnetic path for the magnetic fields generated in the transformer by a summation of currents coming from the parallel converters 305.

Figure 7:
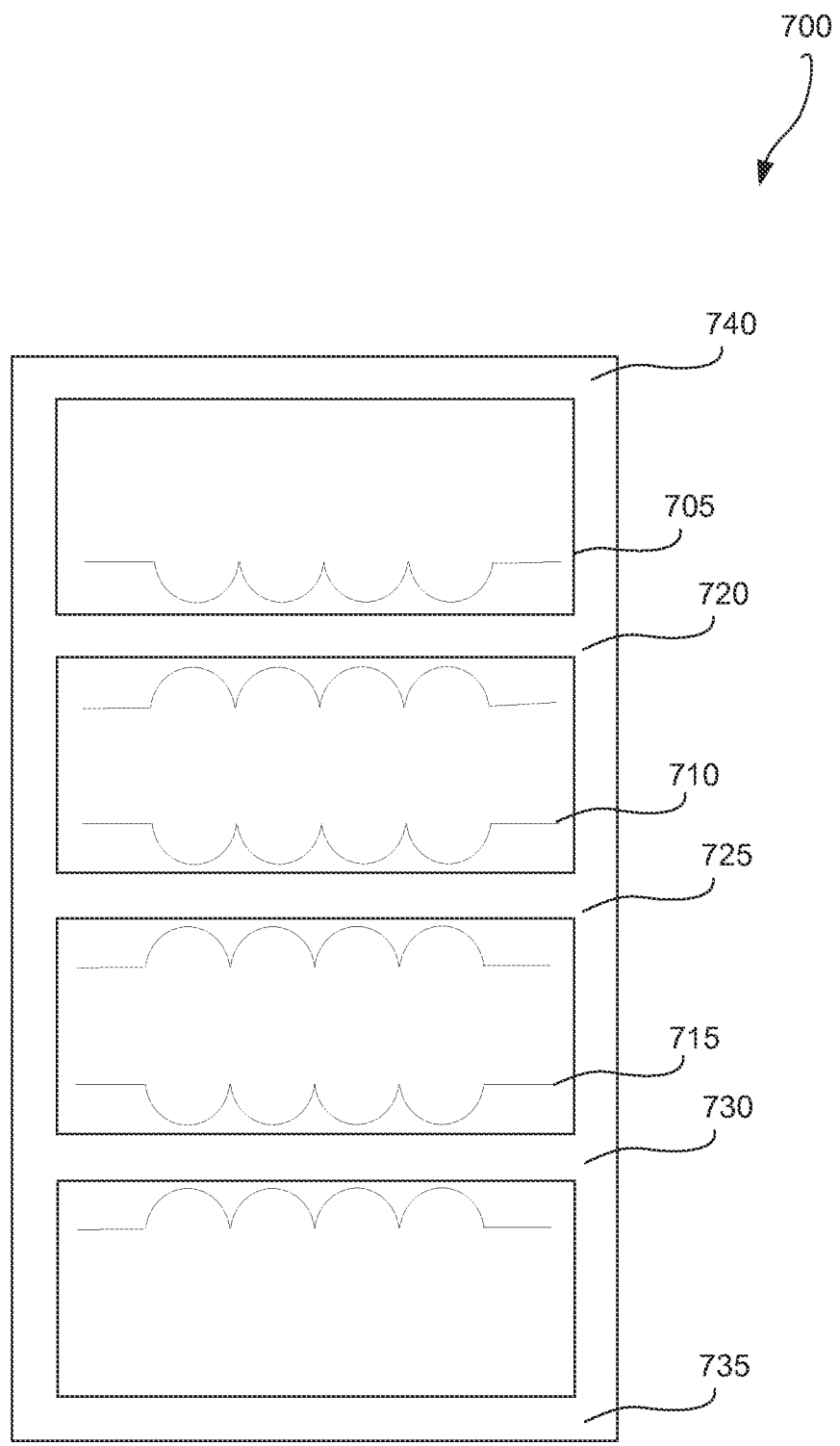
FIG. 7 is a schematic representation of a five-leg transformer with a path for common mode flux, according to an example embodiment.

FIG. 7 is a schematic representation of a five-leg transformer 700 with a path for common mode flux. The five-leg transformer 700 comprises an iron core with legs 720, 725, 730, 735 and 740. Legs 720, 725, and 730 have windings 705, 710, and 715 respectively, while legs 735 and 740 have no winding. Therefore, legs 735 and 740 provide separate magnetic paths for common-mode flux. When used in the alternative power converter system 300 or alternative power converter system 400, the five-leg transformer 700 may provide separate magnetic paths for the magnetic fields generated in the transformer by a summation of currents coming from the parallel converters 305.

Figure 8:
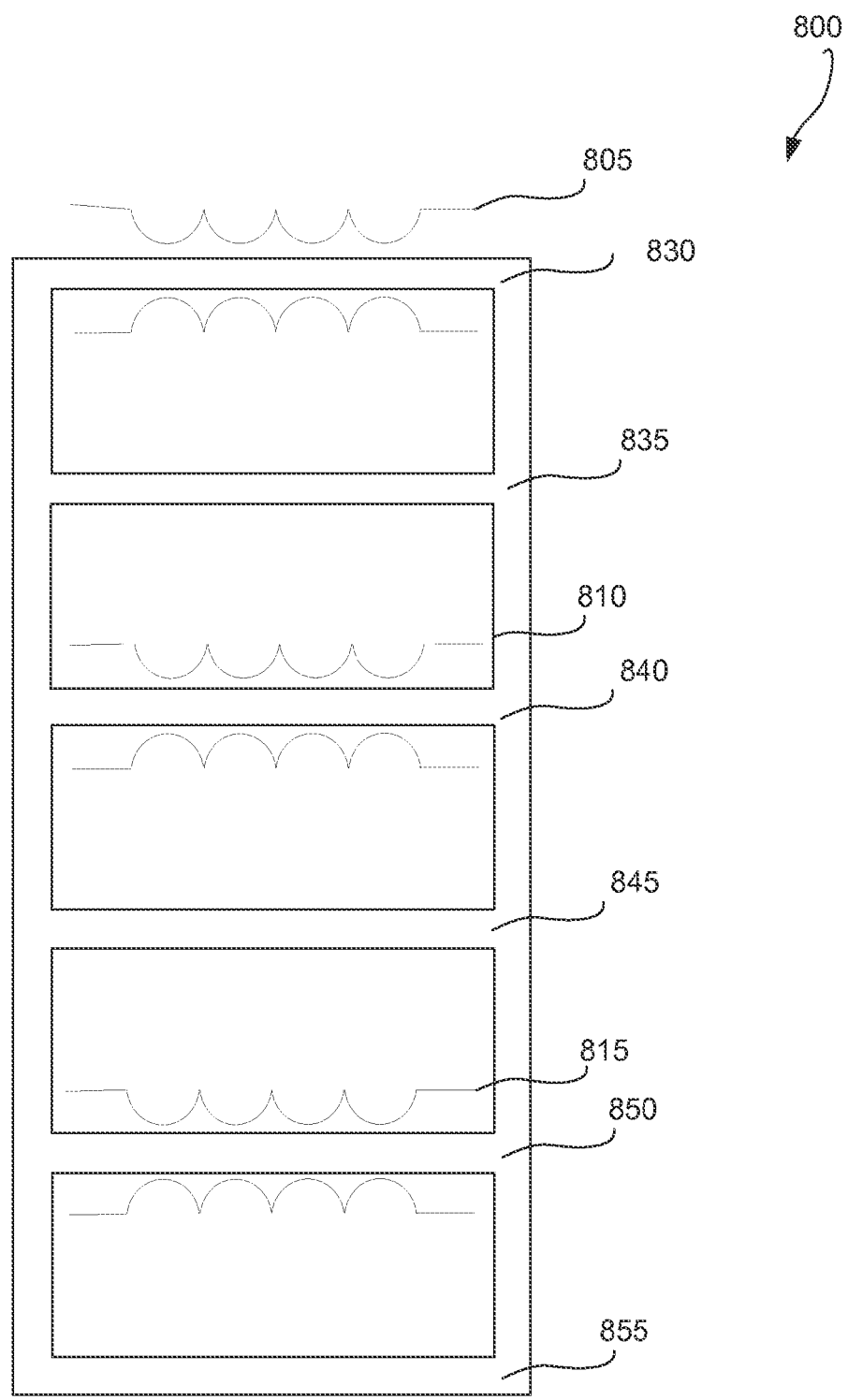
FIG. 8 is a schematic representation of a six-leg transformer with a path for common mode flux, according to an example embodiment.

FIG. 8 is a schematic representation of a six-leg transformer 800 with a path for common mode flux. The six-leg transformer 800 comprises an iron core with legs 830, 835, 840, 845, 850, and 855. Legs 830, 840, and 850 have windings 805, 810, and 815 respectively, while legs 835, 845, and 855 have no windings. Therefore, legs 835, 845, and 855 provide separate magnetic paths for common-mode flux. When used in the alternative power converter system 300 or alternative power converter system 400, the six-leg transformer 800 may provide separate magnetic paths for the magnetic fields generated in the transformer by a summation of currents coming from the parallel converters 305.

Figure 9:
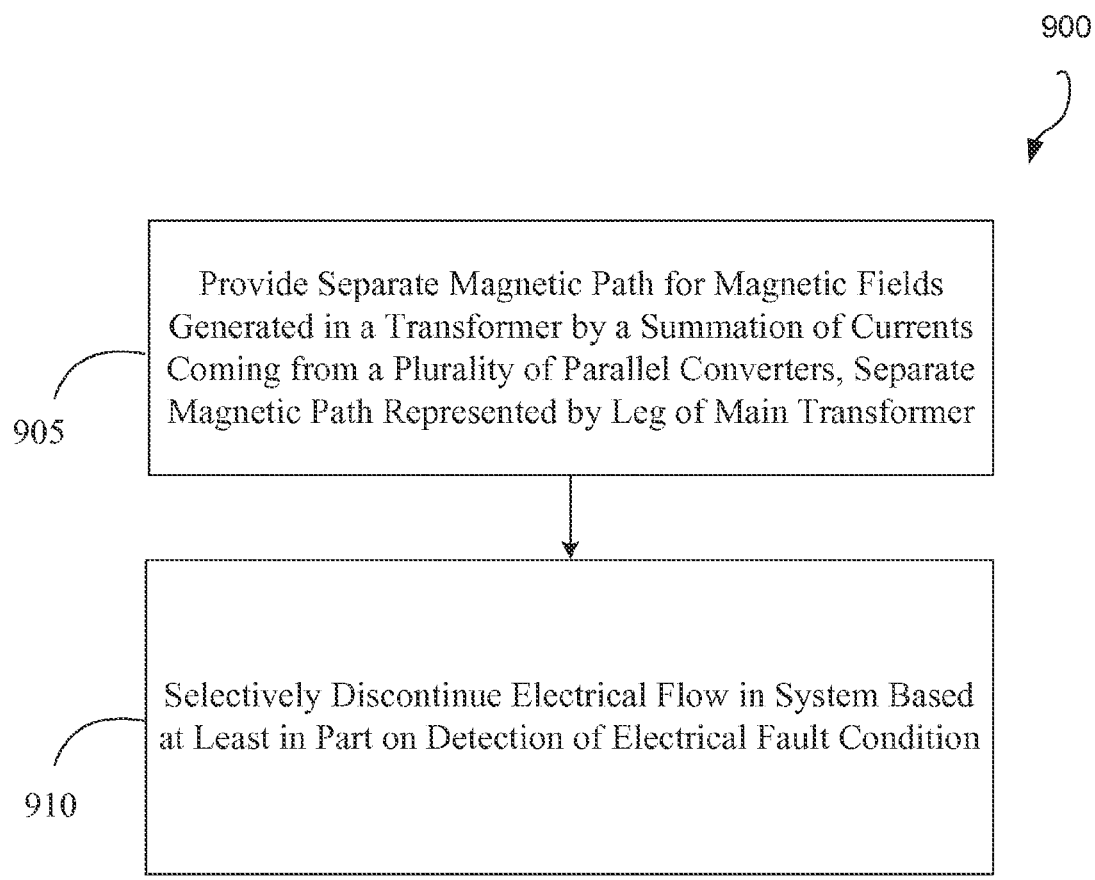
FIG. 9 is a flow diagram of a method for optimization of an alternative power converter system, according to an example embodiment.

FIG. 9 is a flow diagram of a method 900, according to an example embodiment. The method 900 may be implemented by the alternative power converter system 300 or alternative power converter system 400 and their respective components as shown in FIGS. 3 and 4. The method 900 may start in block 905 with providing at least one separate magnetic path for magnetic fields generated in the transformer by a summation of currents coming from the plurality of parallel converters. The separate magnetic path may be represented by at least one leg of a main transformer. The main transformer may be one of the transformers illustrated by FIGS. 6, 7, and 8.

In block 910, the method 900 includes discontinuing electrical flow in the system based at least in part on detection of an electrical fault condition. The method 900 ends after block 910.

References are made to block diagrams of systems, methods, apparatuses, and computer program products according to example embodiments of the disclosure. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based or programmable consumer electronics, mini-computers, mainframe computers, and so forth.

Application programs that are components of the systems and methods described herein may include routines, programs, components, data structures, and the like, that implement certain abstract data types and perform certain tasks or actions. In a distributed computing environment, the application program (in whole or in part) may be located in local memory or in other storage. In addition, or as an alternative, the application program (in whole or in part) may be located in remote memory or in storage to allow for circumstances where tasks are performed by remote processing devices linked through a communications network.

It will be appreciated that the technology described herein may be embodied in many forms and should not be limited to That which is claimed is:

1. An energy power converter system, the system comprising:
   a plurality of parallel converters;
   a main transformer electrically coupled to the plurality of parallel converters, the main transformer having at least one separate magnetic path for magnetic fields generated in the main transformer by a summation of currents coming from the plurality of parallel converters, wherein the at least one separate magnetic path includes at least one leg of the main transformer, the at least one leg having no winding, and
   a converter control device electrically coupled to the plurality of parallel converters and the main transformer and configured to discontinue electrical flow in the system based at least in part on detection of an electrical fault condition.

2. The system of claim 1, further comprising one or more of the following:
   a wind turbine generator electrically coupled to the plurality of parallel converters, the main transformer, and the converter control device; and
   an electrical power grid electrically coupled to one or more of the plurality of parallel converters, the main transformer, and the converter control device.

3. The system of claim 1, wherein the main transformer includes a plurality of magnetic paths, the plurality of magnetic paths exceeding a number of phases by at least one.

4. The system of claim 1, further comprising a common circuit breaker configured to:
   detect an electrical fault condition in the system; and
   based on the detection, selectively discontinue an electrical flow between the plurality of the parallel converters and the main transformer to prevent damage to the system.

5. The system of claim 1, further comprising a plurality of circuit breakers, each corresponding to one of the plurality of the parallel converters, each of the plurality of circuit breakers configured to:
   detect an electrical fault condition in a corresponding parallel converter; and
   based on the detection, discontinue an electrical flow between the corresponding parallel converter and the main transformer to prevent damage to the system.

6. The system of claim 1, further comprising one or more sensors and one or more circuit breakers installed throughout the energy power converter system, the converter control device being configured to:
   receive fault data from the one or more sensors; and
   based on the fault data, selectively instruct the one or more circuit breakers to discontinue electrical flow in the system.

7. The system of claim 1, further comprising one or more fuses located in one or more of the following: one of the plurality of parallel converters, a current transformer, the main transformer, a cable between the parallel converter and the main transformer, and a circuit breaker.

8. The system of claim 7, wherein the one or more fuses are located in the main transformer.

9. The system of claim 1, further comprising one or more current transformers, the one or more current transformers located in one or more of the following: the main transformer, a converter, and on either side of a circuit breaker.

10. The system of claim 1, further comprising one or more circuit breakers configured to discontinue electrical flow during maintenance of the system.

11. The system of claim 1, wherein the main transformer comprises a multi-leg transformer.

12. A method comprising:
   providing at least one separate magnetic path for magnetic fields generated in a transformer by a summation of currents coming from a plurality of parallel converters, wherein the at least one separate magnetic path includes at least one leg of a main transformer, the at least one leg having no winding, and
   selectively discontinuing electrical flow in the system based at least in part on detection of an electrical fault condition.

13. The method of claim 12, wherein the plurality of parallel converters is electrically coupled to a wind turbine generator, the main transformer, and a converter control system.

14. The method of claim 12, wherein the plurality of parallel converters is electrically coupled to an electrical power grid.

15. The method of claim 12, further comprising:
   detecting the electrical fault condition, using a plurality of circuit breakers, in one of the plurality of parallel converters; and
   based on the detection, selectively discontinuing the electrical flow between the one of the plurality of parallel converters and the main transformer.

16. The method of claim 12, further comprising:
   receiving fault data from one or more sensors; and
   based on the fault data, selectively instructing one or more circuit breakers to discontinue electrical flow between the plurality of parallel converters and the main transformer.

17. The method of claim 12, wherein the main transformer is a multi-leg transformer.

18. A wind turbine power system comprising:
   a parallel power converter device comprising a plurality of the parallel converters;
   a wind turbine generator configured to generate electrical power for the parallel power converter device, wherein the wind turbine generator is electrically coupled to the parallel power converter device;
   a converter control device coupled to the parallel power converter device and configured to reduce effects of electrical faults in the system; and
   a main transformer having a multi-leg iron core and windings wound around a plurality of legs of the multi-leg iron core, wherein at least one magnetic path for magnetic fields generated in the main transformer by a summation of currents coming from the plurality of parallel converters is provided, wherein the at least one separate magnetic path includes at least one leg of the main transformer, the at least one leg having no winding.

* * * * *